(12) United States Patent
Guo et al.

(10) Patent No.: US 10,333,723 B2
(45) Date of Patent: Jun. 25, 2019

(54) CONTROL DEVICE AND METHOD FOR POWER SUPPLYING OF COMMUNICATIONS NETWORK

(71) Applicant: ZTE CORPORATION, Shenzhen, Guangdong Province (CN)

(72) Inventors: Qiang Guo, Shenzhen (CN); Bin Zhang, Shenzhen (CN); Linguo Wang, Shenzhen (CN); Ruijin He, Shenzhen (CN); Xiaofeng Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 98 days.

(21) Appl. No.: 15/539,140

(22) PCT Filed: Sep. 21, 2015

(86) PCT No.: PCT/CN2015/090174
§ 371 (c)(1),
(2) Date: Jun. 22, 2017

(87) PCT Pub. No.: WO2016/101665
PCT Pub. Date: Jun. 30, 2016

(65) Prior Publication Data
US 2017/0353321 A1    Dec. 7, 2017

(30) Foreign Application Priority Data

Dec. 23, 2014  (CN) .......................... 2014 1 0812352

(51) Int. Cl.
*H04L 12/10*    (2006.01)
*H04W 52/02*   (2009.01)
*G05F 1/56*    (2006.01)

(52) U.S. Cl.
CPC .............. *H04L 12/10* (2013.01); *G05F 1/561* (2013.01); *H04W 52/02* (2013.01); *Y02D 70/00* (2018.01)

(58) Field of Classification Search
CPC ............... G06F 1/26; G06F 1/32; H04L 12/10
See application file for complete search history.

(56) References Cited

U.S. PATENT DOCUMENTS

| 2005/0122140 A1 | 6/2005 | Peker et al. |
| 2006/0078093 A1* | 4/2006 | Karam ...................... H04L 1/22 |
| | | 379/24 |

(Continued)

FOREIGN PATENT DOCUMENTS

| CN | 102801535 A | 11/2012 |
| CN | 102983982 A | 3/2013 |

(Continued)

*Primary Examiner* — Phil K Nguyen
(74) *Attorney, Agent, or Firm* — Ling Wu; Stephen Yang; Ling and Yang Intellectual Property (57) ABSTRACT

A control apparatus and control method for power supply of a communication network are provided. The method includes: detecting circuit data of each power supply circuit, comparing the circuit data of the each power supply circuit to get an average value, and analyzing output circuit data that the each power supply circuit should have; adjusting an output voltage of each power supply circuit according to the output circuit data that each power supply circuit should have; and connecting output voltages of all the power supply circuits in parallel and supplying power to a next stage electrical load.

19 Claims, 6 Drawing Sheets

(56) References Cited

U.S. PATENT DOCUMENTS

| | | | | |
|---|---|---|---|---|
| 2006/0251158 | A1* | 11/2006 | Isachar | H04L 41/12 |
| | | | | 375/219 |
| 2007/0296394 | A1* | 12/2007 | Landry | H04L 12/10 |
| | | | | 323/371 |
| 2009/0222678 | A1 | 9/2009 | Yu et al. | |
| 2012/0060042 | A1* | 3/2012 | Buhari | G06F 1/266 |
| | | | | 713/320 |
| 2012/0242168 | A1 | 9/2012 | Tsai et al. | |

FOREIGN PATENT DOCUMENTS

| | | |
|---|---|---|
| CN | 203086494 U | 7/2013 |
| EP | 2773063 A1 | 9/2014 |

\* cited by examiner

CONTROL DEVICE AND METHOD FOR POWER SUPPLYING OF COMMUNICATIONS NETWORK

TECHNICAL FIELD

The present document relates to the field of communications, and more particularly, to an apparatus and control method for power supply of a communication network.

BACKGROUND

With the continuous development of communication network technologies, when a communication network is utilized to transmit information streams, the communication network can also be utilized to transmit currents to supply power to electrical equipment in the network. For example, power is supplied to electronic equipment, such as network telephones, wireless access points, surveillance cameras, terminal switching equipment, etc. in a network, by using the Ethernet. As another example, power is supplied to electronic equipment, such as telephones, ever-burning lamps, environmental monitoring equipment, etc. in a telephone network, by using the telephone network. Using the communication network to supply power to the equipment solves the problem of difficulty in power acquisition, improves the flexibility for the usage of the equipment, and reduces the installation complexity of the equipment itself and the usage cost. In addition, power supply or outage of equipment can also be controlled remotely by using the communication network.

As the communication network power supply technology is widely used, there are higher power demands for electrical loads in the communication network. To achieve higher power of communication network power supply, usually two or more than two power sourcing equipment will be used to supply power to the same electrical load. When an interface controller receives power from the power sourcing equipment, the power first passes through a current sharing module to make magnitudes of currents in two or more than two power supply lines same, and then passes through a direct current/direct current (DC/DC) converter to be output to the electrical load. Due to differences in power supply distances of the power sourcing equipment and loss in the power supply lines, there is a problem of large voltage difference between each port of the interface controller. The related technical scheme compensates for the voltage difference between all input ports by performing non-DC-to-DC conversion on each input port voltage (e.g., using linear voltage conversion similar to a low dropout regulator (LDO), and a voltage division manner by the series resistors), to achieve current sharing. However, the voltage compensation range of this method is limited, resulting in poor current sharing. Additionally, the greater the pressure difference of the input ports is, the greater the loss is and the lower the efficiency is. In the related technical scheme, there is a method where each power supply line corresponds to one DC-DC voltage converter to achieve current sharing. With the increase of the power supply lines, the number of DC-DC voltage converters increases and the cost will be greatly increased. When power supply time of a plurality of power sourcing equipment are different, electric energy output by each power sourcing equipment cannot be averaged, and the fairness of power supply cannot be realized.

SUMMARY

Embodiments of the present disclosure provide a control apparatus and control method for power supply of a communication network to solve the problem that the fairness of power supply cannot be realized.

An embodiment of the present disclosure provides a control apparatus for power supply of a communication network including N power sourcing equipment, N interface controllers, a monitoring module, a time-sharing control module and i voltage-adjustable direct current-direct current (DC-DC) modules, herein N is an integer number greater than or equal to 2, and i is an integer number greater than or equal to 2 and less than or equal to N.

One side of interface controllers is connected to the power sourcing equipment, and each interface controller is connected to one power sourcing equipment, and the other side is connected to the monitoring module, and the interface controllers are configured to determine whether to receive currents from the power sourcing equipment, and to transmit the currents to a next stage electrical load.

One side of the monitoring module is connected to the interface controllers, and the other side is connected to the time-sharing control module and the voltage-adjustable DC-DC modules, and the monitoring module is configured to detect circuit data of each power supply circuit, compare the circuit data of each circuit to get an average value, analyze output circuit data that the each circuit should have, transmit the output circuit data that the each circuit should have to each voltage-adjustable DC-DC module respectively, and transmit the output circuit data that the each circuit should have to the time-sharing control module.

One side of the time-sharing control module is connected to the monitoring module and the other side is connected to all of the voltage-adjustable DC-DC modules, and the time-sharing control module is configured to calculate and process the circuit data of the monitoring module, transmit time-sharing control signals to the voltage-adjustable DC-DC modules by using a control strategy of time-sharing polling according to a difference in power supply time of the power sourcing equipment, and control opening and closing of power supply at input ends of the voltage-adjustable DC-DC modules to realize control for the power supply time of the power sourcing equipment.

The voltage-adjustable DC-DC modules are connected to the time-sharing control module and output voltages to the electrical load, and the voltage-adjustable DC-DC modules are configured to receive the output circuit data that circuits should have, adjust output voltages and supply power to the electrical load.

In an exemplary embodiment, the power supply circuit includes a power sourcing equipment, an interface controller and other load in a circuit between the power sourcing equipment and the interface controller to constitute a circuit, and the apparatus includes N power supply circuit.

One side of the monitoring module is connected to the interface controllers, and the other side is connected to the time-sharing control module and the voltage-adjustable DC-DC modules, which includes: N input ends of the monitoring module are connected to the N power supply circuits respectively, and N output ends of the monitoring module are connected to input ends of the time-sharing control module and the i voltage-adjustable DC-DC modules respectively.

One side of the time-sharing control module is connected to the monitoring module and the other side is connected to all of the voltage-adjustable DC-DC modules, which includes: N input ends of the time-sharing control module are connected to the N output ends of the monitoring module, and N output ends of the time-sharing control module are connected to input ends of the i voltage-adjustable DC-DC modules respectively.

The voltage-adjustable DC-DC modules output the voltages to the electrical load, which includes: output ends of the i voltage-adjustable DC-DC modules are connected in parallel and output the voltages to the next stage electrical load.

In an exemplary embodiment, the monitoring module includes a detecting unit and a processing unit.

The detecting unit is configured to detect the circuit data of the each power supply circuit. The processing unit is configured to compare the circuit data of the each circuit to get the average value, analyze the output circuit data that the each circuit should have, and transmit the output circuit data that the each circuit should have to the time-sharing control module and the each voltage-adjustable DC-DC module respectively.

In an exemplary embodiment, the time-sharing control module includes a time-sharing processing unit and a power supply control unit.

The time-sharing processing unit is configured to calculate and process the circuit data of the monitoring module and transmit the time-sharing control signals to the power supply control unit by using the control strategy of time-sharing polling according to the difference in power supply time of the power sourcing equipment.

The power supply control unit is configured to control the opening and closing of power supply at the input ends of the voltage-adjustable DC-DC modules to realize control for the power supply time of the power sourcing equipment.

In an exemplary embodiment, the voltage-adjustable DC-DC module includes an output voltage feedback network control unit and a DC-DC conversion unit.

The output voltage feedback network control unit is configured to receive the output circuit data that the circuit should have, control opening and closing of the DC-DC conversion unit, and/or adjust an output voltage of the DC-DC conversion unit.

The DC-DC conversion unit is configured to realize a conversion from a DC input voltage to a DC output voltage in the circuit and adjust the output voltage.

An embodiment of the present disclosure further provides a control method for power supply of a communication network, which uses the control apparatus for power supply of the communication network described above. The method includes:

detecting the circuit data of the each power supply circuit, comparing the circuit data of the each power supply circuit to get the average value, and analyzing the output circuit data that the each power supply circuit should have;

adjusting an output voltage of the each power supply circuit according to the output circuit data that the each power supply circuit should have; and connecting output voltages of all the power supply circuits in parallel and supplying power to the next stage electrical load.

In an exemplary embodiment, after the step of detecting the circuit data of each power supply circuit, comparing the circuit data of the each power supply circuit to get the average value, and analyzing the output circuit data that the each power supply circuit should have, the method further includes:

controlling opening and closing of power supply of each input end of the voltage-adjustable DC-DC modules according to the output circuit data of the each power supply circuit.

In an exemplary embodiment, controlling opening and closing of power supply of each input end of the voltage-adjustable DC-DC modules according to the output circuit data of the each power supply circuit includes:

transmitting the time-sharing control signals to the voltage-adjustable DC-DC modules by using the control strategy of time-sharing polling according to the difference in the power supply time of the power sourcing equipment, and controlling the opening and closing of power supply of the input ends of the voltage-adjustable DC-DC modules.

In an exemplary embodiment, before the step of detecting the circuit data of the each power supply circuit, comparing the circuit data of the each power supply circuit to get the average value, and analyzing the output circuit data that the each power supply circuit should have, the method further includes:

receiving DC currents from the N power sourcing equipment, herein N is an integer number greater than or equal to 2.

In a control apparatus and control method for power supply of a communication network provided by the embodiments of the present disclosure, circuit data of each power supply circuit is detected first; the circuit data of the each power supply circuit is compared to get an average value; output circuit data that the each power supply circuit should have is analyzed; then an output voltage of the each power supply circuit is adjusted according to the output circuit data that the each power supply circuit should have; and after that, output voltages of all the power supply circuits are connected in parallel and power is supplied to a next stage electrical load. Fair power supply is implemented, and the problem that fairness of power supply cannot be achieved is solved.

DETAILED DESCRIPTION

In a control apparatus and control method for power supply of a communication network provided by the embodiments of the present disclosure, circuit data of each power supply circuit is detected and compared by a monitoring module to get an average value, and output circuit data that the each power supply circuit should have is analyzed, and power supply time of each power sourcing equipment is adjusted automatically by using a control strategy of time-sharing polling to complete average power supply of the power sourcing equipment in a period of time, and the number of redundant DC-DC (DC to DC) modules may be cut, and at the same time, an output voltage is adjusted automatically by using multiple voltage-adjustable DC-DC modules according to the received data to complete equalization process for an input current of each power supply circuit. Thus, the apparatus and control method for power supply of a communication network can not only achieve the fairness of power supply, effectively improve the voltage compensation range, increase the conversion efficiency of current equalization, and lower the system heat consumption, but also reduce the number of DC-DC modules and the use cost, and adapt to wider application scenarios. The embodiments of the present disclosure will be described in detail below in conjunction with the accompanying drawings. It should be noted that the embodiments in the present application and features in the embodiments can be freely combined with each other without conflict.

In embodiments of the present disclosure, the power sourcing equipment refers to a source end supplying electric energy, and the electrical load refers to a load that eventually needs to use electric energy. In power supply of the communication network, an interface controller (one side is connected to the power sourcing equipment, and the other side is connected to a monitoring module) is usually provided between the power sourcing equipment and the electrical load, and the interface controller controls whether to receive the current from the power sourcing equipment, and transmits the current to the next stage electrical load (the next stage electrical load refers to all devices, which need to use electricity, at the next stage of the interface controller). The communication network may be a power supply network that can provide DC current, such as Ethernet, telephone network, etc. The power sourcing equipment, the interface controller, and other load in a circuit therebetween are collectively referred to as a power supply circuit.

The control apparatus and control method for power supply of the communication network provided by the embodiments of the present disclosure are applicable to a case where N power supply circuits supply power to an electrical load, herein N is an integer number greater than or equal to 2. The control apparatus for power supply of the communication network in accordance with the embodiment of the present disclosure may be a separate device or may be integrated with the above-mentioned interface controller into the same device or may be integrated with the next stage electrical load into the same device, or may be integrated with the previous stage interface controller and the next stage electrical load into the same device.

The embodiment one of the present disclosure is described in conjunction with the accompanying drawings hereinafter.

Figure 1:
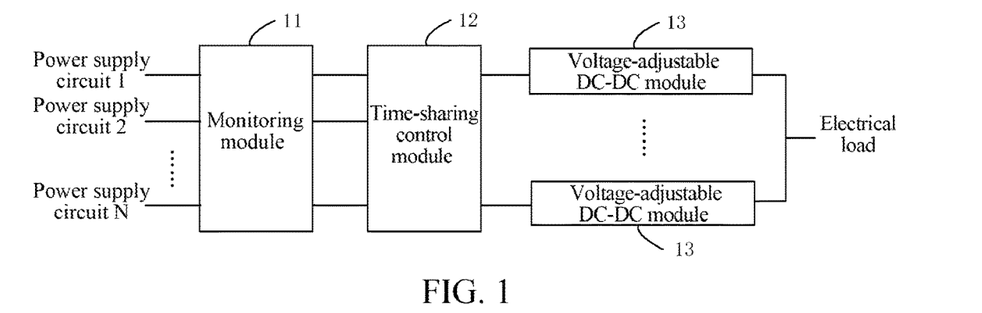
FIG. 1 is a structural diagram of a control apparatus for power supply of a communication network in accordance with an embodiment of the present disclosure.

FIG. 1 is a structural diagram of a control apparatus for power supply of a communication network in accordance with an embodiment of the present disclosure. As shown in FIG. 1, the apparatus includes a monitoring module 11, a time-sharing control module 12, and i voltage-adjustable DC-DC modules 13.

The monitoring module 11 is configured to detect circuit data of each power supply circuit, compare the circuit data of the each circuit to get an average value, analyze output circuit data that the each circuit should have, and transmit the output circuit data that the each circuit should have to the time-sharing control module 12 and each voltage-adjustable DC-DC module 13 respectively.

One side of the time-sharing control module 12 is connected to the monitoring module 11 and the other side is connected to the voltage-adjustable DC-DC modules 13. The time-sharing control module 12 is configured to calculate and process the circuit data of the monitoring module 11, transmit time-sharing control signals to a power supply control unit by using a control strategy of time-sharing polling according to a difference in power supply time of the power sourcing equipment, and control opening and closing of power supply of input ends of the voltage-adjustable DC-DC modules (i.e., whether to supply power to the voltage-adjustable DC-DC modules) to realize control for the power supply time of the power sourcing equipment. When the number N of the power sourcing equipment which can supply electric energy is greater than the demand of an electrical load, the number i of the voltage-adjustable DC-DC modules may be cut by using the control strategy of time-sharing polling. The number i only need to meet system power supply, and under normal circumstances, the number i is less than N. The conversion efficiency of the DC-DC modules is also improved due to improvement of a valid load of a single DC-DC module.

The voltage-adjustable DC-DC modules 13 are connected to the time-sharing control module 12 and are configured to receive the output circuit data that circuits should have and adjust output voltages.

Here, N input ends of the monitoring module 11 are connected to N power supply circuits respectively, and N output ends of the monitoring module 11 are connected to input ends of the time-sharing control module 12 and the i voltage-adjustable DC-DC modules 13 respectively.

N input ends of the time-sharing control module 12 are connected to the N output ends of the monitoring module 11, and N output ends of the time-sharing control module 12 are connected to the input ends of the i voltage-adjustable DC-DC modules 13 respectively.

N output ends of the voltage-adjustable DC-DC modules 13 are connected in parallel and then power is supplied to the next stage electrical load.

One side of the monitoring module 11 is connected to the interface controllers and the other side is connected to the time-sharing control module 12. The monitoring module 11 is arranged behind each power supply circuit, that is, behind each interface controller, and detects the circuit data of each power supply circuit. The circuit data refers to detectable circuit data including current data and/or voltage data. The monitoring module 11 compares the detected circuit data of each circuit to get the average value, analyzes the output voltage that each circuit should have, and transmits the output circuit data that each circuit should have to the time-sharing control module 12 and each DC-DC module 13 respectively. The time-sharing control module 12 calculates and processes the circuit data of the monitoring module 11, and according to the difference in the power supply time of the power sourcing equipment, transmits the time-sharing control signals to the voltage-adjustable DC-DC modules 13 by using the control strategy of time-sharing polling, and controls the opening and closing of power supply of the input ends of the voltage-adjustable DC-DC modules 13 to realize control for the power supply time of the power sourcing equipment. The voltage-adjustable DC-DC modules 13 adjust the output voltage of each circuit. All the circuits with the adjusted output voltages are connected in parallel to supply power to the next stage electrical load.

Here, the monitoring module 11 is connected in series in a power supply line. The monitoring module 11 may be within the power supply circuit or may be outside the power supply circuit. The monitoring module 11 transmits data information to the time-sharing control module 12, and transmits control information to each voltage-adjustable DC-DC module 13.

Figure 2:
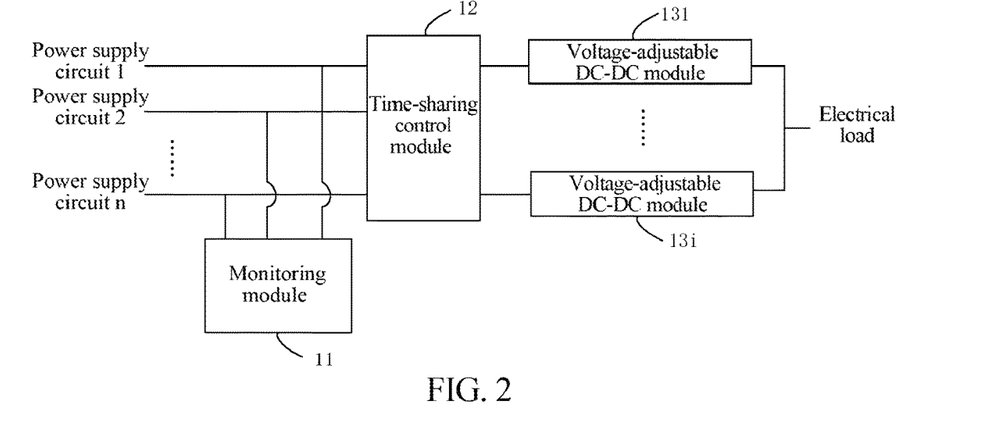
FIG. 2 is a structural diagram of another control apparatus for power supply of a communication network in accordance with an embodiment of the present disclosure.

FIG. 2 is a structural diagram of another control apparatus for power supply of a communication network in accordance with an embodiment of the present disclosure. As shown in FIG. 2, all are the same as those in FIG. 1, except that the monitoring module 11 is connected in parallel in the line.

Figure 3:
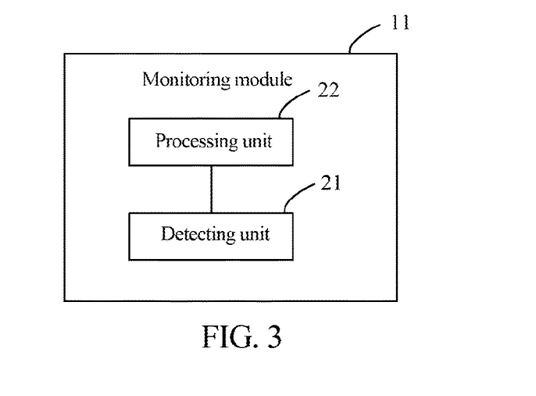
FIG. 3 is a structural diagram of a monitoring module in a control apparatus for power supply of a communication network in accordance with an embodiment of the present disclosure.

In the above-mentioned embodiment, as shown in FIG. 3, in the control apparatus for power supply of the communication network described above, the monitoring module 11 includes a detecting unit 21 and a processing unit 22.

The detecting unit 21 is configured to detect circuit data of each power supply circuit.

The processing unit 22 is configured to compare the circuit data of each circuit to get the average value, analyze the output circuit data that each circuit should have, and transmit the output circuit data that each circuit should have to each voltage-adjustable DC-DC module 13 respectively.

Figure 4:
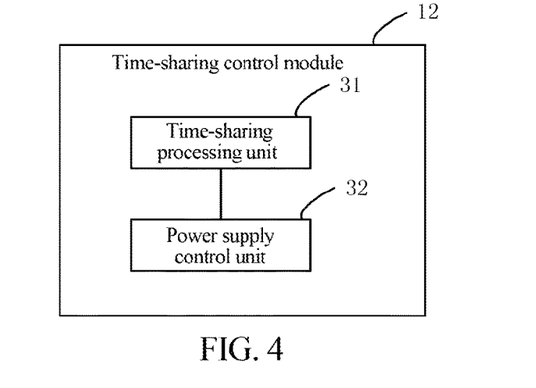
FIG. 4 is a structural diagram of a time-sharing control module in a control apparatus for power supply of a communication network in accordance with an embodiment of the present disclosure.

In one embodiment, as shown in FIG. 4, in the control apparatus for power supply of the communication network described above, the time-sharing control module 12 includes a time-sharing processing unit 31 and a power supply control unit 32.

The time-sharing processing unit 31 is configured to calculate and process the circuit data of the monitoring module and transmit time-sharing control signals to the power supply control unit according to the different length in the power supply time of the power sourcing equipment.

The power supply control unit 32 is configured to control opening and closing of power supply of the input ends of the voltage-adjustable DC-DC modules to realize control for the power supply time of the power sourcing equipment.

Figure 5:
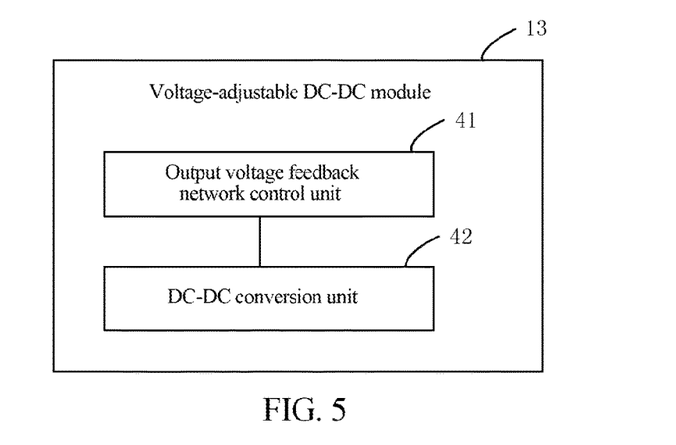
FIG. 5 is a structural diagram of a voltage-adjustable DC-DC module in a control apparatus for power supply of a communication network in accordance with an embodiment of the present disclosure.

In one embodiment, as shown in FIG. 5, in the control apparatus for power supply of the communication network described above, each of the voltage-adjustable DC-DC modules 13 includes an output voltage feedback network control unit 41 and a DC-DC conversion unit 42.

The output voltage feedback network control unit 41 is configured to receive the output circuit data that the circuit should have, control opening and closing of the DC-DC conversion unit 42, and/or adjust an output voltage of the DC-DC conversion unit.

The DC-DC conversion unit 42 is configured to realize a conversion from a DC input voltage to a DC output voltage in the circuit and adjust the output voltage.

The output voltage feedback network control unit 41 may control the DC-DC conversion unit 42 to perform voltage conversion, and may control the opening and closing of an output end of the DC-DC conversion unit 42.

Figure 6:
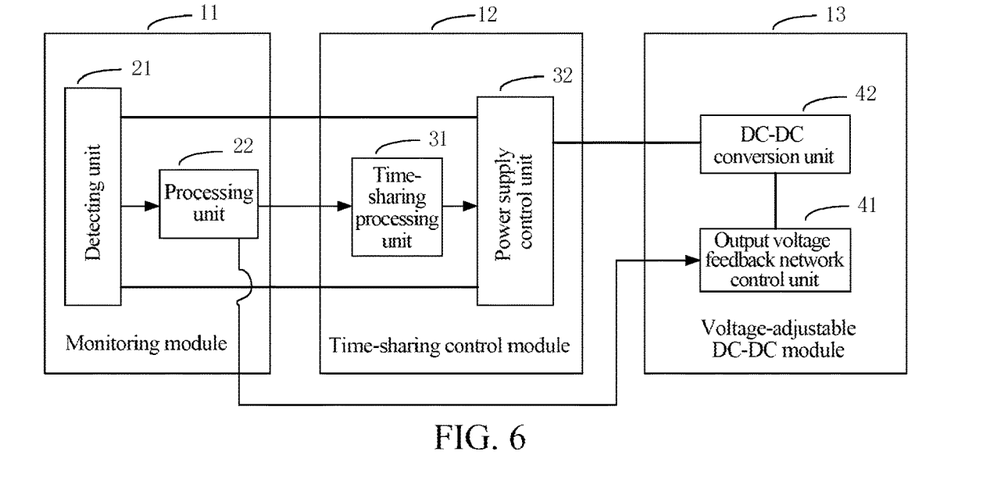
FIG. 6 is a schematic diagram of a connecting relation of a monitoring module, a time-sharing control module and a voltage-adjustable DC-DC module in a control apparatus for power supply of a communication network in accordance with an embodiment of the present disclosure.

In one embodiment, in the control apparatus for power supply of the communication network described above, a connecting structure of the detecting unit 21 and the processing unit 22 in the monitoring module 11, the time-sharing processing unit 31 and the power supply control unit 32 in the time-sharing processing module 12, and the output voltage feedback network control unit 41 and the DC-DC conversion unit 42 in the voltage-adjustable DC-DC converter 13 is as shown in FIG. 6.

The control apparatus for power supply of the communication network provided by the embodiments described above can track dynamic changes of the load of each power supply circuit in real time, solve the current-sharing problem caused by the dynamic changes of the load, complete equalization processing for input current, which not only effectively increases a voltage compensation range, improves the conversion efficiency of the current equalization, and lowers the system heat consumption, but also reduces the number of the DC-DC modules and the use cost, and achieves the fairness of power supply and adapt to wider application scenarios.

Figure 7:
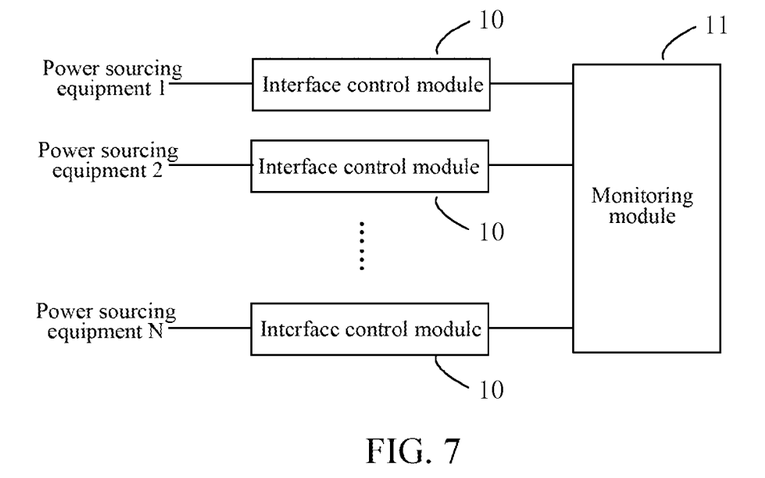
FIG. 7 is a schematic diagram of a connecting relation of interface controllers and the monitoring module in a control apparatus for power supply of a communication network in accordance with an embodiment of the present disclosure.

In one embodiment, as shown in FIG. 7, the control apparatus for power supply of the communication network described above may further include N interface controllers 10. Each interface controllers 10 is configured to receive a direct current from one power sourcing equipment, and an input end of each interface controller 10 is connected to the power sourcing equipment, and an output end of each interface controller 10 is connected to an input end of the monitoring module 11.

Figure 8:
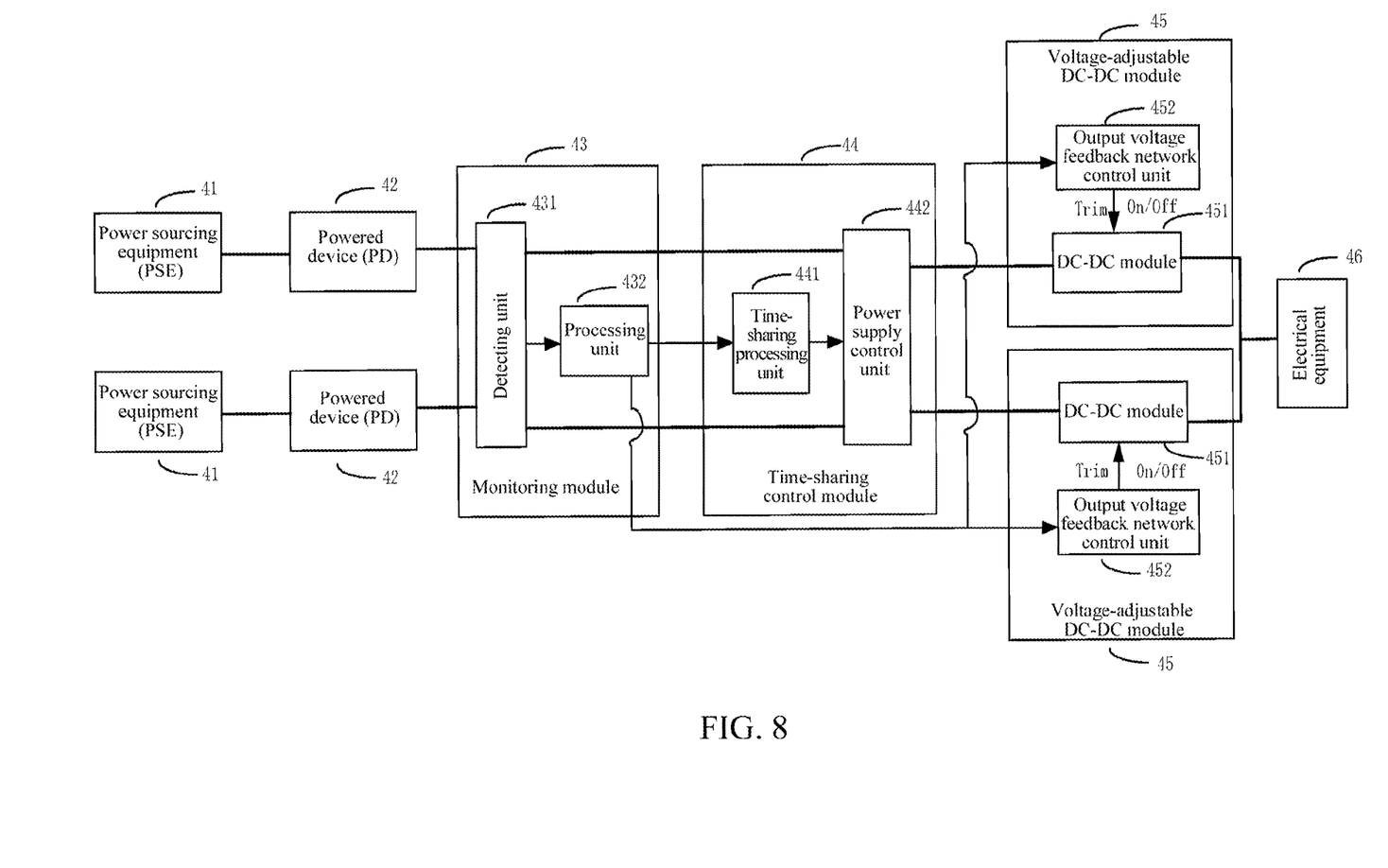
FIG. 8 is a structural diagram of an embodiment of a control apparatus for power supply of a communication network in an application scenario in accordance with an embodiment of the present disclosure.

FIG. 8 is a structural diagram of a control apparatus for power supply of a communication network in an application scenario in accordance with an embodiment of the present disclosure. In this application scenario, the communication network providing electric energy is Ethernet, and two Ethernet power sourcing equipment (PSEs) 41 supply power to an electrical load 46. To receive a DC current provided by the PSE, two interface controllers are required. The interface controller in the Ethernet power supply is called powered device (PD).

As shown in FIG. 8, a monitoring module 43 is arranged behind each power supply circuit and connected in series in the power supply line, and a detecting unit 431 is connected to output ends of two powered devices 42 to detect the circuit data of each power supply circuit. A processing unit 432 of the monitoring module 43 compares the circuit data of two power supply circuits to get an average value, analyzes the output voltage that each circuit should have, and transmits the output voltage that each circuit should have to the time-sharing control module 44 and two voltage-adjustable DC-DC modules 45. A time-sharing processing unit 441 in the time-sharing control module 44 receives output current, voltage and power supply time length data of the circuit transmitted by the processing unit 432, and after the data is calculated and processed, outputs the control signals to a power supply control unit 442, which is configured to control opening and closing of power supply of an input end of a DC-DC conversion unit 451.

An output voltage feedback network control unit 452 in the voltage-adjustable DC-DC module 45 receives output voltage information that the circuit should have, transmitted by the processing unit 432, controls the opening and closing of the DC-DC conversion unit 451, and/or adjusts the output voltage of the DC-DC conversion unit 451. The output voltage is adjusted by the DC-DC conversion unit 451 so that a voltage at an output end satisfies the power supply requirement. Output ends of two DC-DC conversion units 451 are connected in parallel to supply power to a next stage electrical load 46. In FIG. 8, a straight line represents a path of a DC current, and an arrowed straight line represents a path of data information and control information.

Figure 9:
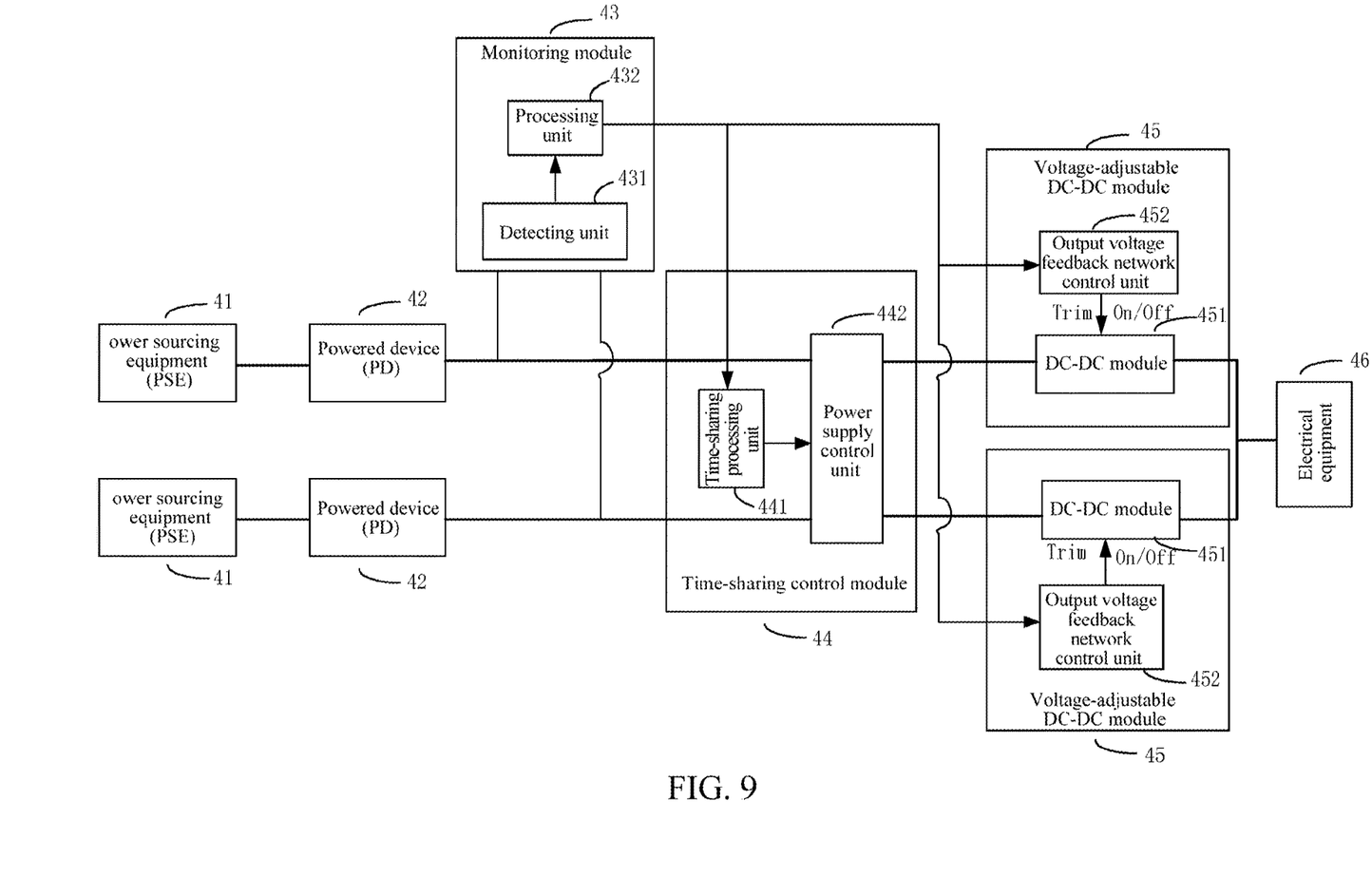
FIG. 9 is a schematic diagram of an embodiment of a control apparatus for power supply of a communication network in another application scenario in accordance with an embodiment of the present disclosure.

FIG. 9 is a schematic diagram of a control apparatus for power supply of a communication network in another application scenario in accordance with an embodiment of the present disclosure. In this application scenario, as shown in FIG. 9, all are the same as those in FIG. 8, except that the monitoring module 11 is connected in parallel in the line.

Embodiment two of the present disclosure is described in conjunction with the accompanying drawings hereinafter.

Figure 10:
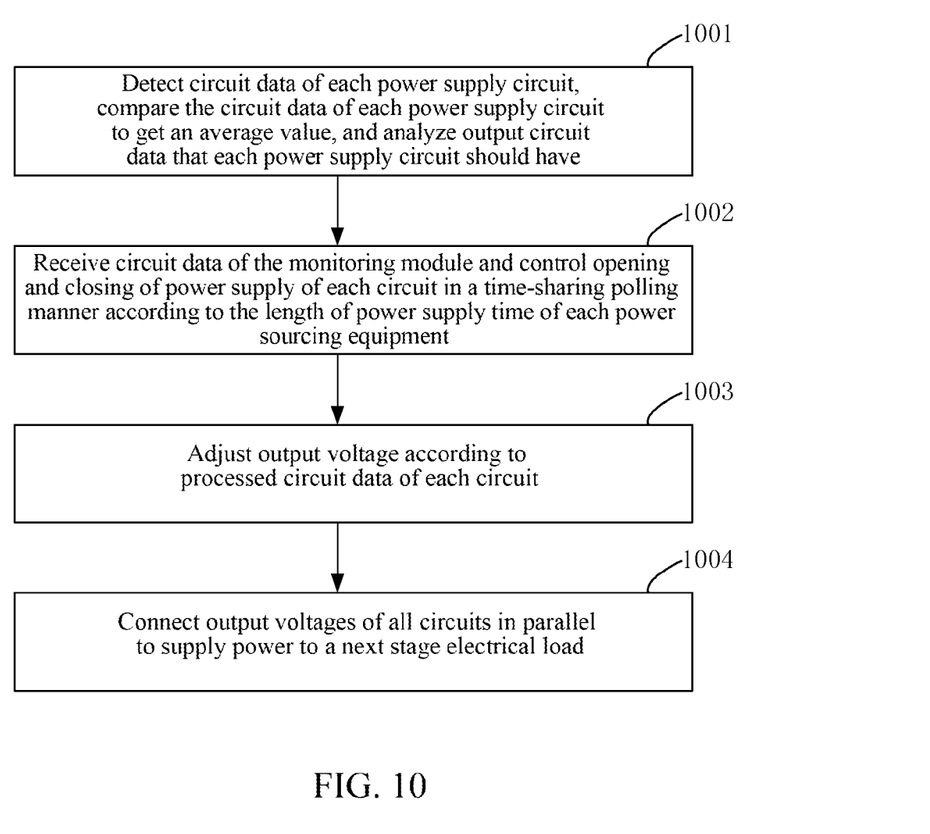
FIG. 10 is a flowchart of a control method for power supply of a communication network in accordance with an embodiment of the present disclosure.

FIG. 10 is a flowchart of a control method for power supply of a communication network in accordance with an embodiment of the present disclosure, including the following steps 1001-1004.

In step 1001, circuit data of each power supply circuit is detected, and the circuit data of the each circuit is compared to get an average value, and output circuit data that the each circuit should have is analyzed.

In step 1002 (optional), the circuit data of a monitoring module is received, and opening and closing of power supply of each circuit is controlled in a time-sharing polling manner according to the length of power supply time of each power sourcing equipment.

In step 1003, an output voltage is adjusted according to the output circuit data that the each circuit should have.

In step 1004, output voltages of all the power supply circuits are connected in parallel to supply power to a next stage electrical load.

The monitoring module first detects the circuit data of each power supply circuit, compares the detected circuit data of each circuit to get the average value, analyze the output voltage that the each circuit should have, and transmit the output circuit data that each circuit should have to the time-sharing control module and each voltage-adjustable DC-DC module respectively. Then, the time-sharing control module processes the circuit data of the monitoring module, and controls the opening and closing of power supply of each circuit in the time-sharing polling manner according to the length of the power supply time of power sourcing equipment. At the same time, each voltage-adjustable DC-DC module adjusts the output voltage of each circuit according to the output circuit data that each circuit should have. Finally, output voltages of all the circuits are connected in parallel to supply power to the next stage electrical load.

In an exemplary embodiment, after the circuit data of each circuit is compared to get the average value and the output circuit data that each circuit should have is analyzed, the method further includes: calculating and processing the circuit data, determining opening and closing of power supply of the input ends of the voltage-adjustable DC-DC modules according to the length of the power supply time of the power sourcing equipment, and controlling opening and closing of a DC-DC conversion function.

In an exemplary embodiment, before step 1001, the method further includes: DC currents from the N power sourcing equipment are received, herein N is an integer number greater than or equal to 2.

In the control method for power supply of the communication network provided by the above embodiment, power supply of each power sourcing equipment is controlled according to the difference in power supply time of the power sourcing equipment by using the control strategy of time-sharing polling. Therefore, the fairness of the power supply of the power sourcing equipment is achieved in a period of time, and the number of redundant DC-DC modules can be cut to reduce the use cost; dynamic changes of the load of each power supply circuit is tracked in real time, and the current sharing problem caused by the dynamic changes of the load is solved, and equalization processing for input current is completed, and a voltage compensation range is effectively increased, and the conversion efficiency of current equalization is improved, and the system heat consumption is lowered to adapt to wider application scenarios.

Those skilled in the art can understand that all or parts of steps of the above-mentioned embodiments can be implemented by using computer program processes. The computer program can be stored in one computer readable storage medium. The computer program is executed on the corresponding hardware platform (e.g., system, equipment, apparatus, device, etc), and when the computer program is executed, one of steps of the method embodiments or the combination thereof is included.

Alternatively, all or parts of steps of the above-mentioned embodiments can also be implemented by using integrated circuits, and these steps can be fabricated into individual integrated circuit modules respectively, or multiple modules or steps in these steps are fabricated into a single integrated circuit to implement. Therefore, the embodiments of the present disclosure are not limited to any specific combination of the hardware and software.

Various devices/functional modules/functional units in the above-mentioned embodiments can be implemented by using a general-purpose computing device, or they can be centralized on a single computing device, or distributed on a network which consists of multiple computing devices.

Various devices/functional modules/functional units in the above-mentioned embodiments are implemented in the form of software functional module, and when sold or used as a separate product, they can be stored in one computer readable storage medium. The above-mentioned computer readable storage medium can be read-only memory, disk or compact disc, etc.

INDUSTRIAL APPLICABILITY

In a control apparatus and control method for power supply of a communication network provided by the embodiments of the present disclosure, circuit data of each power supply circuit is detected first; the circuit data of each power supply circuit is compared to get an average value; output circuit data that each power supply circuit should have is analyzed; then an output voltage of each power supply circuit is adjusted according to the output circuit data that each power supply circuit should have; and after that, output voltages of all the power supply circuits are connected in parallel and power is supplied to a next stage electrical load. Therefore, fair power supply is implemented, and the voltage compensation range is effectively increased, and the conversion efficiency of current equalization is improved, and the system heat consumption is lowered, the number of DC-DC modules and the use cost are reduced to adapt to wider application scenarios.

What we claim is:

1. A control apparatus for power supply of a communication network comprising N power sourcing equipment; and N interface controllers, wherein N is an integer number greater than or equal to 2, and i is an integer number greater than or equal to 2 and less than or equal to N; wherein, the control apparatus for power supply of a communication network further comprises a processor and a storage device, wherein the storage device stores processor-executable programs, and the programs comprise: a monitoring module, a time-sharing control module, and i voltage-adjustable direct current-direct current (DC-DC) modules,
one side of the interface controllers is connected to the N power sourcing equipment, and each interface controller is connected to one power sourcing equipment, and the other side is connected to the monitoring module, and the interface controllers are configured to determine whether to receive currents from the power sourcing equipment, and to transmit the currents to a next stage electrical load;
one side of the monitoring module is connected to the interface controllers, and the other side is connected to the time-sharing control module and the voltage-adjustable DC-DC modules, and the monitoring module is configured to detect circuit data of each power supply circuit, compare the circuit data of each circuit to get an average value, analyze output circuit data that the each circuit should have, transmit the output circuit data that the each circuit should have to each voltage-adjustable DC-DC module respectively, and transmit the output circuit data that the each circuit should have to the time-sharing control module respectively;
one side of the time-sharing control module is connected to the monitoring module and the other side is connected to all of the voltage-adjustable DC-DC modules, and the time-sharing control module is configured to calculate and process the circuit data of the monitoring module, transmit time-sharing control signals to the voltage-adjustable DC-DC modules by using a control strategy of time-sharing polling according to a difference in power supply time of the power sourcing equipment, and control opening and closing of power supply at input ends of the voltage-adjustable DC-DC modules to realize control for power supply time of the power sourcing equipment; and
the voltage-adjustable DC-DC modules are connected to the time-sharing control module and output voltages to the electrical load, and the voltage-adjustable DC-DC modules are configured to receive the output circuit data that circuits should have, adjust output voltages and supply power to the electrical load.

2. The control apparatus for power supply of a communication network according to claim 1, wherein the power supply circuit comprises a power sourcing equipment, an interface controller and other load in a circuit between the power sourcing equipment and the interface controller to constitute one circuit, and the apparatus comprises N power supply circuits;
one side of the monitoring module is connected to the interface controllers, and the other side is connected to the time-sharing control module and the voltage-adjustable DC-DC modules, which comprises: N input ends of the monitoring module are connected to the N power supply circuits respectively, and N output ends of the monitoring module are connected to input ends of the time-sharing control module and the i voltage-adjustable DC-DC modules respectively;
one side of the time-sharing control module is connected to the monitoring module, and the other side is connected to all of the voltage-adjustable DC-DC modules, which comprises: N input ends of the time-sharing control module are connected to the N output ends of the monitoring module, and N output ends of the time-sharing control module are connected to input ends of the i voltage-adjustable DC-DC modules respectively; and
the voltage-adjustable DC-DC modules output the voltages to the electrical load, which comprises: output ends of the i voltage-adjustable DC-DC modules are connected in parallel and output the voltages to the next stage electrical load.

3. The control apparatus for power supply of a communication network according to claim 1, wherein the monitoring module comprises a detecting unit and a processing unit, wherein
the detecting unit is configured to detect the circuit data of the each power supply circuit; and
the processing unit is configured to compare the circuit data of the each circuit to get the average value, analyze the output circuit data that the each circuit should have, and transmit the output circuit data that the each circuit should have to the time-sharing control module and the each voltage-adjustable DC-DC module respectively.

4. The control apparatus for power supply of a communication network according to claim 1, wherein the time-sharing control module comprises a time-sharing processing unit and a power supply control unit, wherein,
the time-sharing processing unit is configured to calculate and process the circuit data of the monitoring module and transmit the time-sharing control signals to the power supply control unit by using the control strategy of time-sharing polling according to the difference in power supply time of the power sourcing equipment; and
the power supply control unit is configured to control the opening and closing of power supply at the input ends of the voltage-adjustable DC-DC modules.

5. The control apparatus for power supply of a communication network according to claim 1, wherein the voltage-adjustable DC-DC module comprises an output voltage feedback network control unit and a DC-DC conversion unit, wherein
the output voltage feedback network control unit is configured to receive the output circuit data that the circuit should have, control opening and closing of the DC-DC conversion unit, and/or adjust an output voltage of the DC-DC conversion unit; and
the DC-DC conversion unit is configured to realize a conversion from a DC input voltage to a DC output voltage in the circuit and adjust the output voltage.

6. A control method for power supply of a communication network, which uses the control apparatus for power supply of the communication network according to claim 1, the method comprising:
detecting the circuit data of the each power supply circuit, comparing the circuit data of the each power supply circuit to get the average value, and analyzing the output circuit data that the each power supply circuit should have;
adjusting an output voltage of the each power supply circuit according to the output circuit data that the each power supply circuit should have; and
connecting output voltages of all the power supply circuits in parallel and supplying power to the next stage electrical load.

7. The control method for power supply of a communication network according to claim 6, wherein after the step of detecting the circuit data of the each power supply circuit, comparing the circuit data of the each power supply circuit to get the average value, and analyzing the output circuit data that the each power supply circuit should have, the method further comprises:

controlling opening and closing of power supply of each input end of the voltage-adjustable DC-DC modules according to the output circuit data of the each power supply circuit.

8. The control method for power supply of a communication network according to claim 7, wherein the controlling opening and closing of power supply of each input end of the voltage-adjustable DC-DC modules according to the output circuit data of the each power supply circuit comprises:
transmitting the time-sharing control signals to the voltage-adjustable DC-DC modules by using the control strategy of time-sharing polling according to the difference in the power supply time of the power sourcing equipment, and controlling the opening and closing of power supply of the input ends of the voltage-adjustable DC-DC modules.

9. The control method for power supply of a communication network according to claim 6, wherein before the step of detecting the circuit data of the each power supply circuit, comparing the circuit data of the each power supply circuit to get the average value, and analyzing the output circuit data that the each power supply circuit should have, the method further comprises:
receiving DC currents from the N power sourcing equipment, wherein N is an integer number greater than or equal to 2.

10. The control apparatus for power supply of a communication network according to claim 2, wherein the monitoring module comprises a detecting unit and a processing unit, wherein
the detecting unit is configured to detect the circuit data of the each power supply circuit; and
the processing unit is configured to compare the circuit data of the each circuit to get the average value, analyze the output circuit data that the each circuit should have, and transmit the output circuit data that the each circuit should have to the time-sharing control module and the each voltage-adjustable DC-DC module respectively.

11. The control apparatus for power supply of a communication network according to claim 2, wherein the time-sharing control module comprises a time-sharing processing unit and a power supply control unit, wherein,
the time-sharing processing unit is configured to calculate and process the circuit data of the monitoring module and transmit the time-sharing control signals to the power supply control unit by using the control strategy of time-sharing polling according to the difference in power supply time of the power sourcing equipment; and
the power supply control unit is configured to control the opening and closing of power supply at the input ends of the voltage-adjustable DC-DC modules.

12. The control apparatus for power supply of a communication network according to claim 2, wherein the voltage-adjustable DC-DC module comprises an output voltage feedback network control unit and a DC-DC conversion unit, wherein
the output voltage feedback network control unit is configured to receive the output circuit data that the circuit should have, control opening and closing of the DC-DC conversion unit, and/or adjust an output voltage of the DC-DC conversion unit; and
the DC-DC conversion unit is configured to realize a conversion from a DC input voltage to a DC output voltage in the circuit and adjust the output voltage.

13. A control method for power supply of a communication network, which uses the control apparatus for power supply of the communication network according to claim 2, the method comprising:
detecting the circuit data of the each power supply circuit, comparing the circuit data of the each power supply circuit to get the average value, and analyzing the output circuit data that the each power supply circuit should have;
adjusting an output voltage of the each power supply circuit according to the output circuit data that the each power supply circuit should have; and
connecting output voltages of all the power supply circuits in parallel and supplying power to the next stage electrical load.

14. A control method for power supply of a communication network, which uses the control apparatus for power supply of the communication network according to claim 3, the method comprising:
detecting the circuit data of the each power supply circuit, comparing the circuit data of the each power supply circuit to get the average value, and analyzing the output circuit data that the each power supply circuit should have;
adjusting an output voltage of the each power supply circuit according to the output circuit data that the each power supply circuit should have; and
connecting output voltages of all the power supply circuits in parallel and supplying power to the next stage electrical load.

15. A control method for power supply of a communication network, which uses the control apparatus for power supply of the communication network according to claim 4, the method comprising:
detecting the circuit data of the each power supply circuit, comparing the circuit data of the each power supply circuit to get the average value, and analyzing the output circuit data that the each power supply circuit should have;
adjusting an output voltage of the each power supply circuit according to the output circuit data that the each power supply circuit should have; and
connecting output voltages of all the power supply circuits in parallel and supplying power to the next stage electrical load.

16. A control method for power supply of a communication network, which uses the control apparatus for power supply of the communication network according to claim 5, the method comprising:
detecting the circuit data of the each power supply circuit, comparing the circuit data of the each power supply circuit to get the average value, and analyzing the output circuit data that the each power supply circuit should have;
adjusting an output voltage of the each power supply circuit according to the output circuit data that the each power supply circuit should have; and
connecting output voltages of all the power supply circuits in parallel and supplying power to the next stage electrical load.

17. A control method for power supply of a communication network, which uses the control apparatus for power supply of the communication network according to claim 10, the method comprising:
detecting the circuit data of the each power supply circuit, comparing the circuit data of the each power supply circuit to get the average value, and analyzing the output circuit data that the each power supply circuit should have;

adjusting an output voltage of the each power supply circuit according to the output circuit data that the each power supply circuit should have; and connecting output voltages of all the power supply circuits in parallel and supplying power to the next stage electrical load.

18. A control method for power supply of a communication network, which uses the control apparatus for power supply of the communication network according to claim 11, the method comprising:

detecting the circuit data of the each power supply circuit, comparing the circuit data of the each power supply circuit to get the average value, and analyzing the output circuit data that the each power supply circuit should have;

adjusting an output voltage of the each power supply circuit according to the output circuit data that the each power supply circuit should have; and connecting output voltages of all the power supply circuits in parallel and supplying power to the next stage electrical load.

19. A control method for power supply of a communication network, which uses the control apparatus for power supply of the communication network according to claim 12, the method comprising:

detecting the circuit data of the each power supply circuit, comparing the circuit data of the each power supply circuit to get the average value, and analyzing the output circuit data that the each power supply circuit should have;

adjusting an output voltage of the each power supply circuit according to the output circuit data that the each power supply circuit should have; and connecting output voltages of all the power supply circuits in parallel and supplying power to the next stage electrical load.

\* \* \* \* \*